United States Patent Office 3,073,818
Patented Jan. 15, 1963

3,073,818
1α,11α-EPOXY-3β,5,14,19-TETRAHYDROXY-CARDEN-(20,22)-OLIDE
Christoph Tamm, Riehen, Switzerland, and Gert Volpp, Cambridge, Mass., assignors to Sandoz Ltd., Basel, Switzerland
No Drawing. Filed Dec. 26, 1961, Ser. No. 162,188
Claims priority, application Switzerland Dec. 29, 1960
1 Claim. (Cl. 260—239.57)

The present invention relates to a novel epoxy-steroid compound and to a method for its manufacture, said compound having the formula

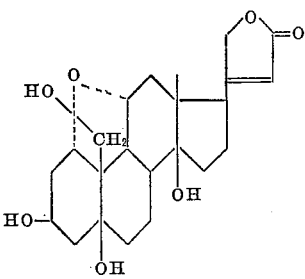

Alternative names for compound I are: 1α,11α-epoxy-3β,5,14,19-tetrahydroxy-carden-(20,22)-olide and 1α,11α-epoxy-strophanthidol.

GENERAL METHOD OF PREPARATION

To prepare the novel epoxy-steroid compound of the present invention in accordance with Formula I above, 1,19-isopropylidene-ouabagenin or ouabain is treated with an aqueous alcoholic solution of hydrochloric acid. Compound I may further be produced, according to the latter from ouabagenin with an aqueous alcoholic solution of hydrochloric acid.

The process may, for example, be effected as follows: 1,19-isopropylidene-ouabagenin is heated at reflux for 30 minutes to 1 hour in aqueous alcohol containing a 0.05 N hydrochloric acid. The solution is evaporated to dryness in a vacuum and then worked up in known manner.

Compound I may also be obtained by splitting off water from ouabagenin by heating at reflux for 30 minutes to one hour with a 0.05 to 1 N hydrochloric acid.

Compound I may furthermore be obtained by splitting off water from the glycoside ouabain by heating at reflux for 30 minutes with a 0.05 N hydrochloric acid. It had hitherto been found that the splitting off of water in the case of ouabain or 1,19-isopropylidene-ouabagenin in an acid medium occurred in the 5-position, so that it was not to be expected that the abovementioned compounds would yield compound I when treated with dilute hydrochloric acid in aqueous alcohol.

It is to be noted that the compound I contains an epoxy group in the 1,11-position (a feature which is new in steroids) and a hydroxy group in the 5-position: the presence of the epoxy group affords the possibility of producing corticosteroids having an oxygen function in the 11-position and a double bond in the 1-position, whereas the hydroxy group makes possible the production of $\Delta^{1,4}$-3-keto-steroids.

Compound I may be used as an intermediate compound for the synthesis of therapeutically active steroids which are characterised by a hydroxy radical in the 3,5- and 14-position and an unsaturated lactone-5-ring in the 17-position. The epoxy radical in the 1,11-position differentiates compound I from strophanthidol.

By degradation with ozone a compound having a ketol side chain typical of the corticosteroids may be produced from compound I. By degradation with potassium permanganate of the diacetyl derivative of compound I the etianic acid radical, present in the chemotherapeutically active corticosteroids, may be introduced.

In the following non-limitative examples all temperatures are stated in degrees C. The melting points are corrected.

Example 1.—Monoanhydro-Ouabagenin, i.e. [1α,11α-Epoxy - 3β,5,14,19 - Tetrahydroxy - Carden - (20,22)-Olide]; 1α,11α-Epoxy-Strophanthidol From 1,19-Isopropylidene-Ouabagenin 6.0 g. of 1,19-isopropylidene-ouabagenin having a melting point of 282–288° are boiled at reflux with 600 cc. of 96% ethanol containing 3.5 cc. of hydrochloric acid (=0.05 N hydrochloric acid) for one hour. The mixture is then evaporated to dryness in a vacuum and the residue crystallised from methanol/ether. 1.90 g. of crystalline monoanhydro-ouabagenin having a melting point of 262–275° result. After recrystallisation from methanol/ether needles having a melting point of 274–275° (decomposition) or 306–316° (decomposition) (Kofler block); $[\alpha]_D^{22} = +46° \pm 2°$ (c.=0.467 in methanol). A solution in methanol/chloroform does not give a yellow colour with tetranitromethane. Infrared spectrum (KBr) bands at approximately 2.93μ (OH), 5.54μ and 5.76μ (C=O, butenolide ring), 6.20μ (C=C, butenolide ring).

Chromatography of the mother liquor (2.3 g.) on 69 g. of $Al_2O_3$ yields a further 396 mg. of crystalline monoanhydro-ouabagenin.

Example 2.—Monoanhydro-Ouabagenin From Ouabagenin 104 mg. of ouabagenin having a melting point of 240–250° (paperchromatographically pure) are boiled at reflux for half an hour with 5 cc. of 96% ethanol containing 0.03 cc. of concentrated hydrochloric acid. The residue remaining after evaporation in a vacuum yields 44 mg. of crystalline monoanhydro-ouabagenin having a melting point of 270–276° (decomposition) from methanol/ether. From the mixed melting point and paper chromatography it is seen that this compound is identical with the compound of Example 1.

Example 3.—Monoanhydro-Ouabagenin From Ouabain 1.0 g. ouabain (M.P. 184–187°, paperchromatographically pure) are refluxed with 50 ml. of a 96% ethanolic solution of 0.3 cc. of concentrated HCl for 30 minutes. After evaporation to dryness and further drying of the residue by evaporating with benzene, 0.95 g. of crude product result. Paperchromatography establishes the presence of monoanhydro-ouabagenin which was identical with that of Examples 1 and 2.

Having thus disclosed the invention what is claimed is:
Monoanhydro-ouabagenin having the general Formula I

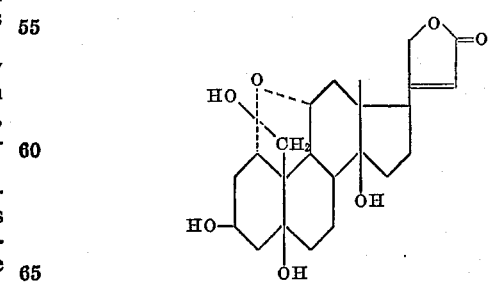

References Cited in the file of this patent

UNITED STATES PATENTS 2,923,709   Colton _____ Feb. 2, 1960

OTHER REFERENCES

Kalvoda et al.: Helvetica Chemica Acta, vol. 44 (1961), pp. 186–198.